VOLATILIZATION LOSSES FROM UREA

SOIL TEXTURE: SASSAFRAS SANDY LOAM
SOIL MOISTURE CONTENT: 13%
SOIL pH: 5.5
ROOM TEMPERATURE: 25 ± 1°C.
TYPE OF APPLICATION: SURFACE
BLEND: 90% ASPHALT, 10% WAX

△ Matrix urea pellets, no inhibitor, 15% blend
○ Matrix urea pellets, no inhibitor, 7% blend
▲ Urea prills, no inhibitor
● Matrix urea pellets, 10% blend, $CuSO_4$ with Cu=0.45% of urea
□ Matrix urea pellets, 10% blend, Pb Acetate with pb=0.45% of urea

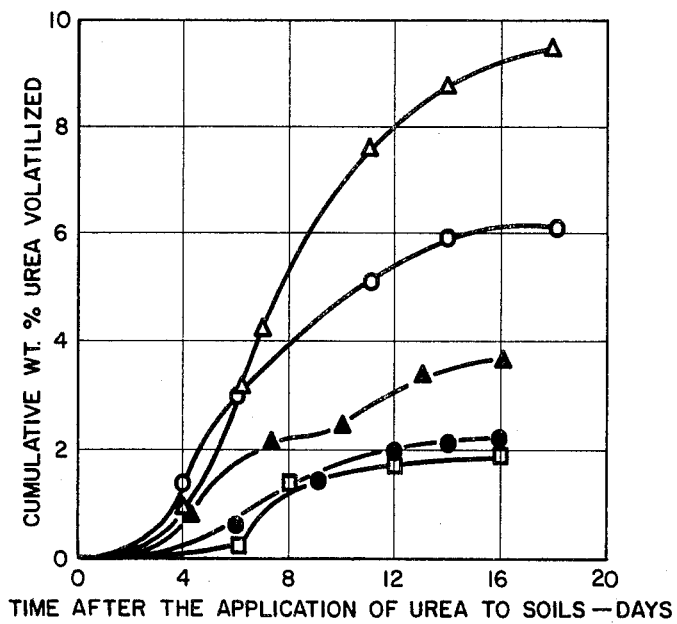

FIG. 3

KAMIL SOR INVENTOR 3,388,989
FERTILIZER COMPOSITION CONSISTING OF UREA, A UREASE INHIBITOR, AND A HYDROCARBON BINDER
Kamil Sor, Linden, N.J., assignor to Esso Research and Engineering Company, a corporation of Delaware
Continuation-in-part of applications Ser. No. 197,309, May 24, 1962, Ser. No. 238,124, Nov. 16, 1962, and Ser. No. 275,742, Apr. 25, 1963. This application July 20, 1964, Ser. No. 383,692
6 Claims. (Cl. 71—28)

ABSTRACT OF THE DISCLOSURE

This disclosure relates to an improved agricultural fertilizer composition which contains urea mixed with a volatilization reducing substance which partially inactivates the urease enzyme, all of which is imbedded in or coated with a solid hydrocarbon such as paraffins, waxes, asphalts, petroleum resins or combinations of same.

---

Figure 1:
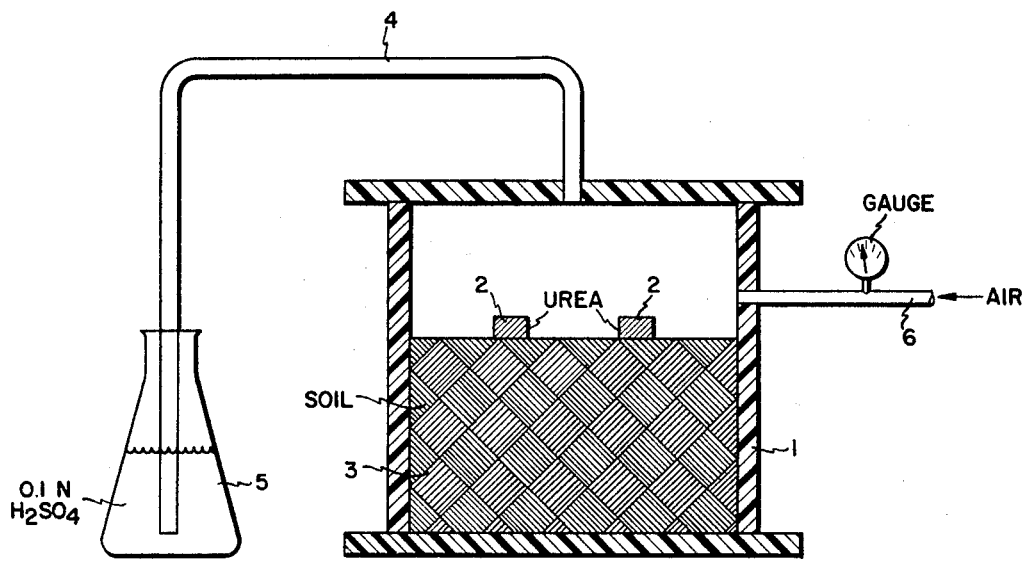

This application is a continuation-in-part of Kamil Sor U.S. patent application Ser. No. 197,309 filed on May 24, 1962; Ser. No. 238,124 filed on Nov. 16, 1962; and Ser. No. 275,742 filed on Apr. 25, 1963. All three of these applications are now abandoned, but were copending with the instant application at the time of its filing.

The present invention is directed to a controlled availability agricultural fertilizer composition. The invention particularly relates to a fertilizer comprising a nitrogen compound having improved properties with respect to the prolonged effective life of the fertilizer. More particularly, the invention is concerned with urea-containing fertilizer which is mixed with a volatilization reducing substance which partially inactivates the urease enzyme, all of which is imbedded in or coated with a solid hydrocarbon such as paraffins, waxes, asphalts, petroleum resins or combinations of same. A preferred combination comprises urea, a urease enzyme inhibitor and a minor amount of a hydrocarbon binder.

It is well-known in the art to use various agricultural aids such as fertilizers, herbicides, fungicides, insecticides and fruit dust containing active control ingredients. These active control ingredients are normally used with various carriers such as with inert solid materials, aqueous solutions and other solvents and the like. For example, fertilizers for promoting plant growth are of two basic types. The oldest type comprises natural organic materials which have certain disadvantages, e.g., their decreasing supply and low nutrient level are inadequate to maintain sufficient food for our ever increasing population. The second type of fertilizer is known as commercial mineral fertilizer mixture and consists largely of organic and inorganic compounds of nitrogen, phosphorus and potassium. Commercial fertilizers have a number of disadvantages. The readily soluble nitrogen compounds may cause injury to crops and may be readily leached into the lower soil layers where the roots of the plants cannot absorb them. Also, the inorganic phosphorus nutrients of the fertilizers tend to become fixed by the clay colloids in the soil and are thus not available to the plants in adequate quantities. Additionally, with some legume and grass crops, the initially high absorption of potassium as well as nitrogen from readily soluble fertilizers may create a toxic condition with resultant injury to the plants.

It is also known in the art to use as an agricultural nutrient urea and urea compounds. However, one disadvantage of urea is that an excessive nitrogen loss as ammonia occurs. This is due to the fact that when urea is placed under or on the surface of soils as a fertilizer, it is hydrolyzed by the influence of urease enzyme which is abundant wherever general microbiological activity exists. The reaction is as follows:

$$CO(NH_2)_2 + 2H_2O \xrightarrow{\text{urease}} (NH_4)_2CO_3$$
$$(NH_4)_2CO_3 \longrightarrow NH_4HCO_3 + NH_3\uparrow$$

Some portion of the ammonia thus formed is held by the base absorbing constituents of soils and the rest (up to 50%) is lost by escaping into air.

In order to overcome this loss of urea as ammonia in soils, many suggestions have been made. For example, Gaylord M. Volk of the Florida Agricultural Experiment Station in "Agricultural and Food Chemistry," vol. 9, No. 4, pages 280–283, 1961, in his report directed toward the inhibition of the urease enzyme states as follows:

"Table I is an attempt to apply this principle to the current problem by dusting urea pellets with copper sulfate prior to application to the soil. According to the data obtained, significant inhibition of urea hydrolysis appears to be impractical by this method, but further study is needed. Apparently, urea diffuses out of the zone of copper effect, thereby rendering the latter ineffective. Copper is readily immobilized by soil, while urea moves freely with soil moisture or by diffusion."

TABLE I.—EFFECT OF COPPER SULFATE DUST OR GYPSUM ON VOLATILE LOSS OF AMMONIA FROM PELLETED UREA-NITROGEN, SURFACE-APPLIED AT 100 LBS./ACRE RATE in LABORATORY TESTS ON MOIST LAKELAND FINE SAND, PH 5.6

| Treatments, Urea 1 to 2 Millimeters Diameter | Replication No. | Nitrogen Loss as NH$_3$ in 7 Days, percent |
|---|---|---|
| Urea | 1 | 34.4 |
|  | 2 | 36.4 |
|  | 3 | 37.9 |
|  |  | [1] 36.2 |
| Urea+0.25% Cu by weight of urea [2] | 1 | 32.0 |
|  | 2 | 32.2 |
|  | 3 | 34.1 |
|  |  | [1] 32.8 |
| Urea+CaSO$_4$.2H$_2$O at 1–1 ratio | 1 | 33.6 |
|  | 2 | 31.5 |
|  | 3 | 38.6 |
|  |  | [1] 34.6 |

[1] Average.
[2] Applied as dry coating to urea pellets, 0.4% Cu was similarly ineffective.

In accordance with the present invention, it has been found that the loss of ammonia by volatilization can be substantially reduced by the partial inactivation of the urease enzyme by using an inhibitor which is incorporated at amounts from about 0.01 to 10.0% by weight of the urea in the fertilizer pellets. The preferred concentration is in the range from about 0.1 to 3 wt. percent. Most preferably, the concentration of inhibitor is in the range from about 0.2 to 2 wt. percent based on the urea.

The present invention can be used to improve any of the known agricultural compositions comprising urea. The inhibitors of the present invention can be added to the compositions in which the active materials are released over an extended time.

The present invention is specifically concerned with an improved fertilizer pellet comprising urea or complex fertilizers containing urea which has been stabilized against urease enzyme action by the use of an inhibitor selected from the group consisting of formaldehyde, a boron metal salt, a fluorine metal salt and a heavy metal ion with an atomic weight greater than 50.0. The amount of inhibitor used may vary appreciably but generally is in the range of from about 0.01 to 10% by weight based on the amount of urea present. Preferably, the amount of inhibitor will be in the range from about 0.1 to 3 wt. percent and most preferably, in the range of from about 0.2 to 2 wt. percent.

The amount of urea, e.g., about 99.5 to 75 wt. percent of the composition present in the pellet may also vary appreciably as compared to the solid hydrocarbon. However, it is preferred that the amount of hydrocarbon present by weight based upon the total amount of urea is in the range from about 3 to 25% by weight, preferably from about 8 to 20% by weight.

While any solid hydrocarbon may be utilized as, for example, a wax or an asphalt, it is preferred that the hydrocarbon comprise from 5 to 20% wax as compared to 80 to 95% asphalt. The wax preferably has a melting point in the range from 100° to 170° F., preferably in the range from 140° to 160° F.

The asphalt has a penetration in the range from about 15 to 200, preferably in the range from 31 to 40. In general, the asphalt should have a softening point above about 120° F., preferably in the range from 130° to 160° F.

The urease enzyme inhibitors of this invention are formaldehyde, boron and fluorine compounds and heavy metal ions, which have atomic weights greater than 50.0. Examples of heavy metal ions which can be used include the ions of copper, molybdenum, cobalt, zinc, manganese, silver, lead and mercury. Hence, it is clear that the present invention envisions the use of urease inhibitors which are soluble salts of a heavy metal selected from the group consisting of: copper, molybdenum, cobalt, zinc, manganese, silver, lead and mercury. The heavy metal ion inhibitors are added as water soluble or partially water soluble salts of the metals such as the sulfates, chlorides, chlorates, nitrates and acetates. Particularly desirable heavy metal ion inhibitors are copper sulfate, molybdenum sulfate, cobalt sulfate, zinc sulfate, manganese sulfate and the corresponding chlorides, nitrates and acetates that are water soluble or partially water soluble.

The boron and fluorine compound inhibitors such as sodium fluoride, potassium fluoride, sodium borate, and potassium borate, are preferably added ot the urea as particles. The particle size of the boron and fluorine compounds should be smaller than 60 mesh and preferably less than 120 mesh. The formaldehyde is added as a solution (e.g. 30 to 45% in water) in an amount in the range of from 0.1 to 10.0 wt. percent based on the urea. During the addition of the inhibitor, fertilizer is mixed so that a uniform mixture of inhibitor and urea is obtained. Preferably, the urea crystals will be between about 20 to 80 mesh. The formaldehyde, boron and fluorine compounds can be added as a solution as set forth with regard to the heavy metal ions. It is, of course, quite apparent that the heavy metal salts can also be added as particles by grinding some to a particle size of less than 60 mesh and intimately mixing with the urea.

The hydrocarbons which can be used in this invention include petroleum waxes, most desirably those of the microcrystalline type, although petroleum asphalts and petroleum derived resins (e.g., steam cracked resins) may also be employed. Also included are blends of waxes with asphalts and/or petroleum resins as well as blends of asphalts with the resins. For example, a blend of a microcrystalline wax or a paraffin wax mixed with from 90 to 95% by weight of a petroleum asphalt might be used. The amount of wax, asphalt or resins or blends thereof used as compared to the urea can be within the range of from about 0.1% to about 25% by weight of the total compositions, although the preferred range of hydrocarbon used is from about 3% to 20% based on the weight of the fertilizer used.

The fertilizer compositions are preferably formed into pellets by a suitable method. One example is an extrusion process using suitable equipment so that the fertilizer product as prepared for the market comprises small pellet particles ranging from a size of about 1/16-inch in diameter and one or two or more sixteenths of an inch in length, to a size of 1/2-inch diameter and a length a little greater or of the same general order. For special applications, pellets may be even larger. Another method that is useful utilizes a rotating plate or disc mounted on an inclined axis. Powdered material is placed centrally on the plate and the pellets are rolled up as the powder moves toward the plate's periphery while powder contacts a liquid binder material.

The fertilizer compositions can also be made by first coating the individual particles or small agglomerates with subsequent formation of larger agglomerates or pellets incorporating the smaller. Supplemental binding or water resistant materials may be incorporated also as the repelleting proceeds.

Complex fertilizer pellets also may be made by first preparing the individual fertilizer components themselves in granulated form of appropriate particle size, as is commonly done in the fertilizer industry. These particles should be smaller than about 6 mesh in U.S. sieves, a size passing a 20 mesh sieve being particularly preferred. It is usually desirable also to separate the very fine materials from the granules. The granules, properly screened, are then blended either as individual fertilizer components or as a mixture with small amounts (from about 2 to 25% by weight) of a binder. A typical binder composition is a molten or liquid hydrocarbon material which is normally solid and which has a softening or melting point above at least 120° F. and preferably above about 130° F. Preferably, where a heated binder is used, the granular fertilizer ingredients are also heated to a temperature at least as high as the melting point of the binder (e.g., hydrocarbon) material, after which the latter, desirably at a somewhat still higher temperature than its melting point, is mixed and blended into the fertilizer until the composition is substantially uniform. Instead of heating, binder may be blended with evaporable solvent to facilitate mixing and particle coating. Binders also may be made wholly or in part of thermoplastic resins or plastics such as polyvinyl compounds, polyethylene, polypropylene, petroleum based resins or the like. These also may be either melted or may be dissolved in suitable evaporable solvents prior to mixing.

A mixture of the types described above, while still plastic, is next extruded through suitable dies to form pellets or small rod-like particles which are compact and solid in structure. The material should contain enough liquid binder to lubricate the dies to some extent, but should be of fairly firm and solid consistency when pelletized. Extruding means are known and form no part of the present invention. Any suitable type may be used, e.g., one wherein the plastic mixture can be forced through orifices or tubular openings of appropriate size and shape. Pellets of 1/16-inch to 1/2-inch or so in diameter are most commonly preferred. The die openings are proportioned in length or taper or otherwise so designed that the frictional forces resisting extrusion will cause the desired degree of compaction to make a strong, firm pellet. The extruded portions as they emerge from the die are cut off or broken off into short rod-like particles, preferably between about 1/16-inch and 3/4-inch in length. Thereafter, the particles or pellets, if made with molten binder, are cooled promptly to a temperature below the softening or melting point of the hydrocarbon. When solvent is used, some heat may desirably be applied to expedite pellet drying and hardening. The resulting product is a dense compact particle of a size that can easily and quite accurately be controlled. It has the desired properties, including a relatively smooth hard surface, and resists rapid water leaching assuming that the binder composition is properly selected. For example, a commercial fertilizer composed of a mixture of urea plus an inhibitor of this invention is mixed with a hot liquid hydrocarbon composition containing about 90% by weight of asphalt and 10% microcrystalline wax. A particularly preferred binder has a softening point above about 150° F., when these ingredients are mixed in proportions of about 93% by weight of urea and 7.0% hydrocarbon and pelletized to a size of about ¼-inch diameter and of smaller or somewhat greater length.

Additional materials can be incorporated with the coated or partially coated granules, after which the materials are compressed or otherwise compacted into pellets or agglomerates of larger size than the original granules. Various binder materials may be used such as heavy hydrocarbon residues, asphalts, waxes, blends of these materials, and/or synthetic plastic materials such as various polymers. These may be heated to liquefy them while mixing is accomplished, or they may be dissolved in low boiling solvents which will evaporate to leave the binder in place on the granules. Prior to pelleting or agglomerating, however, additional material can be added. Such additional materials include inorganic materials such as calcium carbonate, chalk, finely divided limestone rock, calcined lime, gypsum, fine clays and crushed phosphate rock. In addition or in lieu of these inorganic materials, supplementary quantities of organic substances such as the heavy hydrocarbons and polymeric materials mentioned above may be blended.

As pointed out heretofore, the particle size may vary appreciably. The particular particle size is not a part of this invention. The pellets may be in the form of beads or of any other geometric configuration such as a pill, cylinder and the like. The size of the pellets may vary appreciably, but are preferably below about 2 inches in any one dimension as, for example, 2 inches in diameter. It is preferred that the particle size of the pellets vary in the range from 0.05 to 0.5 inch so as to secure better distribution in application. These pellets, as pointed out heretofore, may be secured by any means known in the art as, for example, by spray gun production wherein the molten stream is sprayed into the air or other medium causing solidification of the petroleum hydrocarbon.

Figure 2:
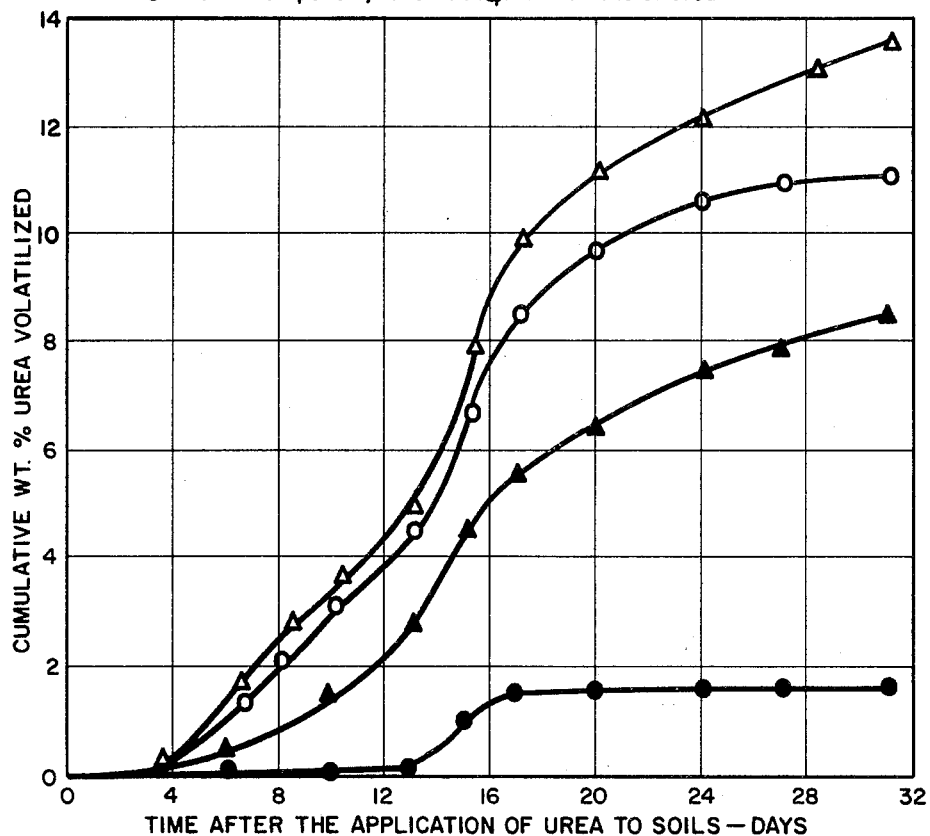
Figure 4:
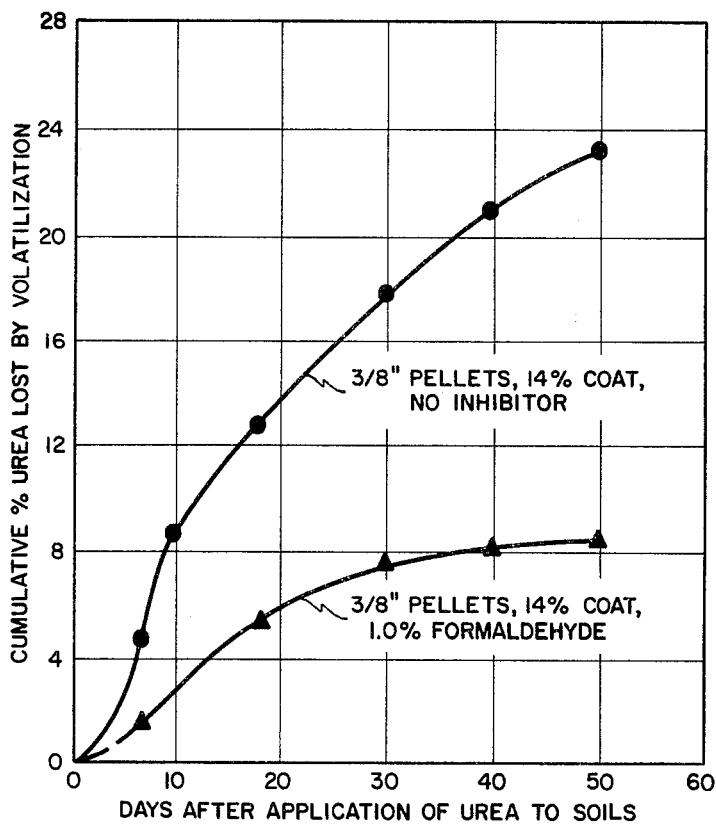
Figure 5:
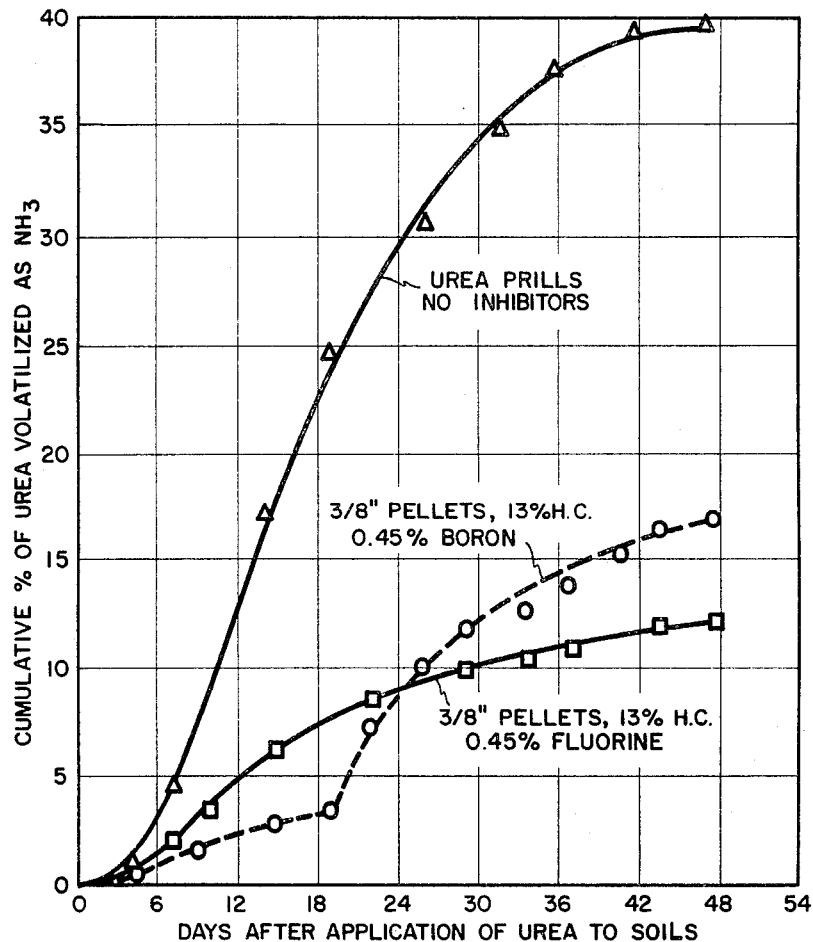

The present invention may be readily understood by reference to the figures. FIGURE 1 illustrates the apparatus used for determining the urea loss. FIGURE 2 plots the data secured in various runs when utilizing a soil moisture content of about 5%. FIGURE 3 illustrates data secured in various runs when using a soil moisture content of about 13%. FIGURE 4 plots the data secured in various runs when utilizing a soil moisture content of about 5.5%. The soil used in FIGURE 4 was at a temperature of 78° F. and had a pH of about 7.0. FIGURE 5 plots the data secured in various runs when utilizing a soil moisture content of about 6.4%. The soil used in FIGURE 5 was at a temperature of about 78° F. and had a pH of about 7.5.

Referring specifically to FIGURE 1, soil with a given moisture content is packed into the Lucite cylinder 1. Then the matrix urea 2 is placed on the surface of the soil 3 at an amount equivalent to the rates of urea generally applied under field conditions. The unit then is closed airtight. Air pressure of about 0.5 p.s.i. is introduced by line 6, passed over the soil and through the tubing 4 into standardized sulfuric acid 5 carrying with it any ammonia evolved by decomposition of the urea. Three times a week the acid is titrated with a normal sodium hydroxide solution and the amount of ammonia neutralized by the acid calculated. The urea pellets were prepared as follows: Urea crystals less than 12 mesh are heated up to 155° to 175° F. Inhibitors less than 100 mesh in size are added to the warm urea and mixed thoroughly. The amount of heavy metal was 0.45% by weight based on the urea. A hydrocarbon blend (90% 31–40 penetration asphalt and 10% microcrystalline wax) is first softened by heating it up to 220° F. and then the blend is added to warm urea. The amount of hydrocarbon blend in urea, in this case, was 10% by weight. This mixture is thoroughly blended for about 10 minutes and then is pelletized by extruding it from a pellet mill. Pellets thus formed can be in sizes between ¹⁄₁₆″ and ⅜″ in diameter.

Referring specifically to FIGURE 2, it can be seen that when utilizing a matrix urea pellet containing 10% of a blend solid hydrocarbon of 90% asphalt and 10% wax and 0.45% of copper based upon the urea, remarkable inhibition of the loss of ammonia was secured. For example, in 20 days the loss when using matrix urea pellets of the present invention was less than 2% whereas when using matrix urea pellets with a 10% blend (90% asphalt and 10% wax) with no inhibitor, the loss was about 11%. This is compared to the loss when using urea prills (100% urea) which was somewhat less than 10%. Substantial improvement was secured also when using a lead ion as lead acetate in matrix urea pellets (6.5%) as compared to the loss occurred when using the matrix urea pellets with no inhibitor and when using the urea prills with no inhibitor. After 28 days, the inhibition of loss of ammonia secured by the lead and copper ion was similarly striking as compared to the high losses secured when using either the matrix urea pellets with no inhibitor and the urea prills, and as also compared to the urea prill in conjunction with an inhibitor as reported by Volk. Reference is made to FIGURE 3 wherein the results of additional tests are shown wherein the soil moisture content is 13% as compared to the soil moisture content of 5% as illustrated in FIGURE 2. All other conditions were similar.

It is to be noted when the urea matrix with a 10% blend was inhibited with a copper ion and with a lead ion, about 2% loss was incurred in 16 days. The urea prill (100% urea) with no inhibitor incurred a substantially greater loss of about 3½% by weight. A urea matrix containing 7% blend with no inhibitor incurred a loss of about 6%, while a urea matrix with a 15% blend incurred a loss of about 9½%.

Referring to FIGURE 4, it can be seen that when utilizing a matrix urea pellet containing no formaldehyde that approximately 23% of the urea was volatilized as ammonia in 50 days. When the urea matrix contained 1.0 wt. percent formaldehyde, only 8% of the urea was volatilized in 50 days. These results indicate that the reduction of ammonia loss by formaldehyde was about threefold.

Referring now to FIGURE 5, there are shown the curves for urea volatilization over a period of about 48 days when no inhibitor was used, when 0.45 wt. percent boron compound inhibitor was used, and when 0.45 wt. percent of a fluorine compound inhibitor was used. The fertilizer pellets from which the data set forth in FIGURE 5 were obtained were made in accordance with the description set forth with regard to FIGURE 2 supra except that the inhibitors were boron and fluorine compounds rather than heavy metal compounds. From the data, it is apparent that in 48 days approximately 39% of the urea volatilizes as ammonia when no inhibitor is used. When 0.45 wt. percent of boron compound was used, the loss in 48 days was only 17% and with a fluorine compound, the loss was about 12%.

It is thus apparent from the foregoing that the loss of urea as ammonia can be substantially reduced when the urea is combined with a solid hydrocarbon and an inhibitor, as compared to using urea alone with an inhibitor or when using the urea with a solid hydrocarbon in the absence of an inhibitor. It is preferred that the inhibitor be added as a water soluble salt and that the hydrocarbon comprise an asphalt or a wax or a blend thereof. It is also preferred that the urea and solid hydrocarbon be uniformly distributed throughout the pellet along with the inhibitor.

What is claimed is:

1. An improved nutrient composition which consists essentially of 3 to 25 wt. percent of a hydrocarbon binder, 0.01 to 10 wt. percent of a urease inhibitor and urea comprising substantially the remaining portion of the composition.

2. A composition as in claim 1 wherein said hydrocarbon binder consists of a mixture of about 5 to 50 wt. percent microcrystalline wax and from about 95 to 50 wt. percent of asphalt.

3. An improved nutrient composition which consists essentially of 3 to 25 wt. percent of a hydrocarbon binder, 0.01 to 10 wt. percent of a urease inhibitor and urea comprising substantially the remaining portion of the composition, said inhibitor being a soluble heavy metal salt wherein said heavy metal has an atomic weight greater than 50.0.

4. An improved nutrient composition which consists essentially of 3 to 25 wt. percent of a hydrocarbon binder, 0.01 to 10 wt. percent of a urease inhibitor and urea comprising substantially the remaining portion of the composition, said inhibitor is a soluble boron salt.

5. An improved nutrient composition which consists essentially of 3 to 25 wt. percent of a hydrocarbon binder, 0.01 to 10 wt. percent of a urease inhibitor and urea comprising substantially the remaining portion of the composition, said inhibitor is a fluorine metal salt.

6. An improved nutrient composition which consists essentially of 3 to 25 wt. percent of a hydrocarbon binder, 0.01 to 10 wt. percent of a urease inhibitor and urea comprising substantially the remaining portion of the composition, said inhibitor being a soluble salt of heavy metal selected from the group consisting of: copper, molybdenum, cobalt, zinc, manganese, silver, lead, and mercury.

References Cited

UNITED STATES PATENTS 3,232,740   2/1966   Sor et al. _____ 71—64 X

OTHER REFERENCES

J. B. Summer and G. F. Somers: Chemistry and Methods of Enzymes, Academic Press, Inc., New York, N.Y., 1953, p. 159.

DONALL H. SYLVESTER, *Primary Examiner.*

R. BAJEFSKY, *Assistant Examiner.*